UNITED STATES PATENT OFFICE.

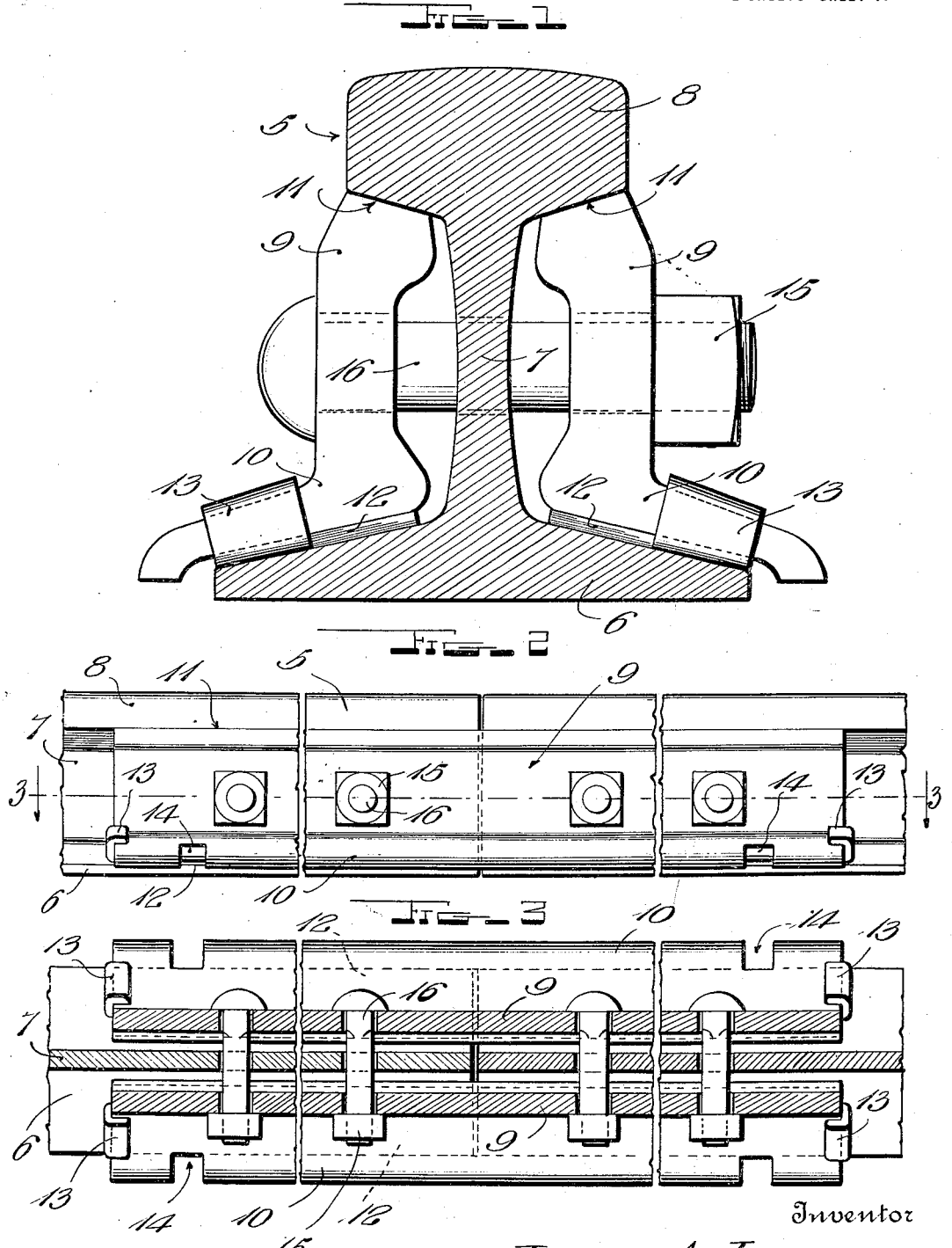

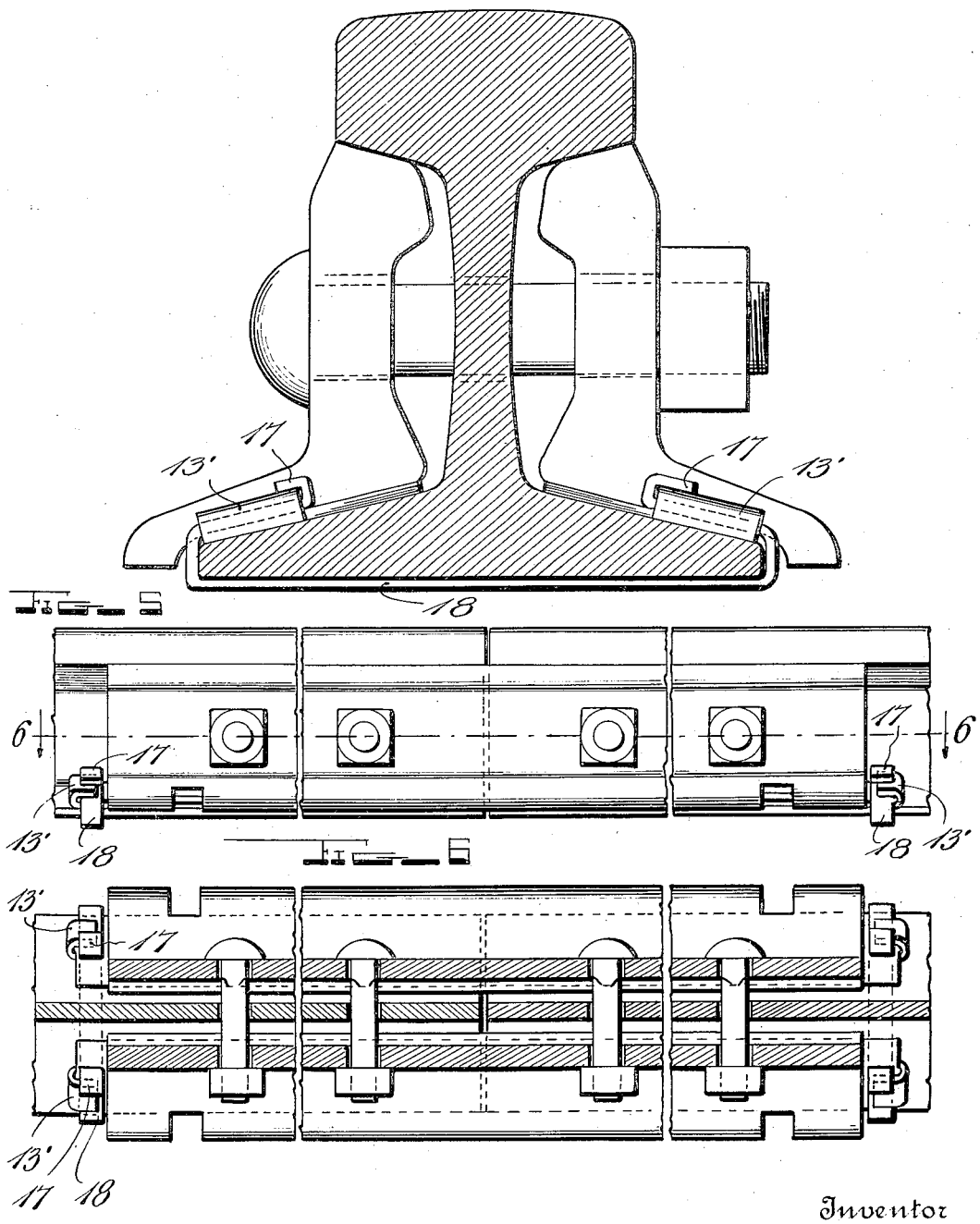

JAMES A. LUPO, OF HOMER, LOUISIANA.

WEAR-COMPENSATING DEVICE.

1,329,982.  Specification of Letters Patent.  Patented Feb. 3, 1920.

Application filed June 14, 1919. Serial No. 304,274.

*To all whom it may concern:*

Be it known that I, JAMES A. LUPO, a citizen of the United States, and a resident of Homer, in the parish of Claiborne and State of Louisiana, have invented new and useful Improvements in Wear-Compensating Devices, of which the following is a specification.

This invention relates to wear compensating devices and has particular reference to that class of wear compensating devices used in connection with fish plates which are used as a means for locking or joining the abutting ends of rail joints.

An important object of the invention is to provide in a device of the above mentioned character a means by which the life of the fish plate may be prolonged.

A further object of the invention is to provide a device of the above mentioned character which may be easily placed in position between the fish plates and the bases of the adjoining rails.

A further object of the invention is to provide in a device of the above mentioned character a means by which the device as a whole may be held in a correct position with respect to the fish plates and rails.

A further object of the invention is to provide a device of the above mentioned character which is simple in construction, strong, durable, reliable in operation and inexpensive to manufacture.

Other objects and advantages of the invention will be apparent during the course of the following description taken in connection with the accompanying drawings.

In the drawings, forming a part of this specification and in which like numerals are employed to designate like parts throughout the same, Figure 1 is a transverse sectional view of a rail having the device embodying my invention associated with the fish plates thereof, Fig. 2 is a side elevation of the adjoining ends of rails, the device embodying my invention being shown in connection therewith, Fig. 3 is a horizontal sectional view taken on line 3—3 of Fig. 2.

Fig. 4 is a similar view to that of Fig. 1 showing a means for locking the compensating device embodying my invention in position, Fig. 5 is a side elevation of the device similar to that shown in Fig. 4, and, Fig. 6 is a horizontal sectional view taken on line 6—6 of Fig. 5.

In the drawings, wherein for the purpose of illustration are shown preferred forms of my invention, the numeral 5 indicates as a whole a rail having a base 6, a web 7 and a ball 8. In joining the abutting ends of the rail 5 as shown in Fig. 2 fish plates 9 are employed, the fish plates being provided with angularly shaped feet 10 and adapted to engage the under face of the ball 8 as shown at 11. In the present day practice, the fish plates employed, due to the friction and wear caused by heavily loaded trains passing over the rail, soon lose their supporting qualities and therefore serve only as a means for tying the ends of the rails. The supporting qualities of the fish plates are destroyed because, due to the passage of trains over the rail joints as aforesaid the fish plates begin to wear not only against the under face of the ball 8 but also where the feet 10 contact with the base of the rails. The object of my invention is as pointed out above, to provide a means for compensating this wear and thereby prolonging the life of the fish plates and to this end I employ elongated shims 12 which are adapted to fit snugly between the bases 6 of the rails 5 and the feet 10 of the fish plates 9. These shims may be employed when the new fish plates are placed in position on the rails at the joints thereof but it is my intention to use them primarily after the fish plates 9 have worn sufficiently at their upper and lower ends to permit them to be easily inserted between the feet 10 of the fish plates and the bases 6 of the rails. In Figs. 1, 2 and 3 I have shown the ends of the shims 12 as bent angularly to provide hooked ends 13 adapted to engage the ends of the fish plates as clearly shown. These hooked ends, as is apparent, prevent longitudinal movement of the shims 12 with respect to the fish plates 9. The shims as will be readily understood, are prevented from slipping or moving from under the feet 10 by means of the conventional form of spikes which are adapted to be driven into the rail ties through openings 14 provided by the fish plates 9. The shims 12 are intended to be inserted into their positions only when the nut 15 of the tie bolt 16 has been at least partially removed.

After the shims are inserted the nut 15 may be run down upon the bolt 16 to bring the fish plates 9 into the position clearly shown in Fig. 1 and retain or lock them in their respective positions.

In Figs. 4 to 6 it will be noted that the hooked ends 13' are not bent over the ends of the fish plates 9 but are so bent as to receive the hooked ends 17 of a tie band 18 passed under the base 6 of the rail. By employing this structure a secure fastening of the shims 12 in their respective position is insured. It will be found advantageous to use the locking element 18 at joints which are so positioned with respect to the ties as to prevent the use of the conventional spike at the joint. To make this clear, it sometimes happens that joints of abutting rails when laid over a trestle work do not rest directly over any portion of the wood structure to which the rails might be spiked. In case the joint does not happen to come directly over a portion of the wood structure or sufficiently near thereto to permit the spikes to be driven into the wood structure the locking bar 18 may be used as a means for preventing any transverse movement of the shims 12 with respect to the rails 5.

It is to be understood that the forms of my invention herewith shown and described are to be taken as preferred examples of the same, and that various changes in the shape, size and arrangement of parts may be resorted to without departing from the spirit of the invention or the scope of the subjoined claims.

Having thus described my invention, what I claim as new and desire to secure and protect by Letters Patent of the United States, is:

1. A compensating device for rail joint fish plates comprising an elongated shim adapted to be secured between the bases of the rails and the foot of a fish plate, hooked ends provided by said shim whereby longitudinal movement of the shim is prevented with respect to the fish plate.

2. A rail compensating device for rail joint fish plates comprising elongated shims adapted to be confined between the bases of the abutting rails and the feet of the fish plates, hooks carried by said shims, and tie bands adapted to engage said hooked ends and the base of the rails to prevent movement of the shims with respect to the fish plates.

JAMES A. LUPO.